(12) United States Patent
Cattaneo

(10) Patent No.: US 9,782,002 B2
(45) Date of Patent: Oct. 10, 2017

(54) PERFECTED HANGING BRACKET FOR THE WALL ASSEMBLY OF A WALL-CUPBOARD

(71) Applicant: Carlo Cattaneo, Como (IT)

(72) Inventor: Carlo Cattaneo, Como (IT)

(73) Assignee: LEONARDO S.R.L., Figino Serenza, Como (IT)

( * ) Notice: Subject to any disclaimer, the term of this patent is extended or adjusted under 35 U.S.C. 154(b) by 0 days.

(21) Appl. No.: 14/437,281

(22) PCT Filed: Oct. 23, 2013

(86) PCT No.: PCT/EP2013/003197
§ 371 (c)(1),
(2) Date: Apr. 21, 2015

(87) PCT Pub. No.: WO2014/072026
PCT Pub. Date: May 15, 2014

(65) Prior Publication Data
US 2015/0272326 A1 Oct. 1, 2015

(30) Foreign Application Priority Data
Nov. 7, 2012 (IT) .............................. MI2012A1894

(51) Int. Cl.
*A47G 29/02* (2006.01)
*A47B 95/00* (2006.01)
(Continued)

(52) U.S. Cl.
CPC ............ *A47B 95/008* (2013.01); *A47B 77/00* (2013.01); *A47B 96/07* (2013.01); *F16B 12/10* (2013.01); *F16B 12/36* (2013.01)

(58) Field of Classification Search
CPC .... F16B 12/10; F16B 2012/103; F16B 12/36; A47B 95/008; A47B 77/00; A47B 96/07
(Continued)

(56) References Cited

U.S. PATENT DOCUMENTS 3,272,061 A * 9/1966 Seckerson ............... F16B 21/02
411/15
5,246,322 A * 9/1993 Salice ..................... F16B 12/14
16/383

(Continued)

FOREIGN PATENT DOCUMENTS

DE 2615425 10/1977
IT DE 2045684 A1 * 3/1972 ........... E04B 1/6154
(Continued)

*Primary Examiner* — Kimberly Wood
(74) *Attorney, Agent, or Firm* — Themis Law

(57) ABSTRACT

A hanging bracket for the wall assembly of a wall-cupboard includes, in combination: a metallic base, an arm assembled and articulated on the base and protruding from it with a hook configured for anchoring to a plate (or other equivalent element) fixed to the wall, first and second regulation mechanisms regulating the position of the arm in height and in depth, respectively, and a flange integral with the base and equipped with at least one fixing unit of the hanging bracket to the wall-cupboard, wherein the fixing unit includes a shear-resistant element cooperating with a fixing peg of the hanging bracket to a shoulder of the cupboard. According to the invention, the peg is fitted onto a collar protruding from the flange, there also being a reciprocal fixing element between the collar and the peg, to make them integral with each other.

6 Claims, 4 Drawing Sheets

(51) Int. Cl.
*F16B 12/10* (2006.01)
*F16B 12/36* (2006.01)
*A47B 77/00* (2006.01)
*A47B 96/07* (2006.01)

(58) Field of Classification Search
USPC .......... 248/205.1, 243; 411/510, 455, 451.3; 403/DIG. 11, DIG. 12, DIG. 13, 230, 242, 403/362
See application file for complete search history.

(56) References Cited

U.S. PATENT DOCUMENTS 5,669,108 A * 9/1997 Ferrari ................. A47B 88/044
 16/383
5,725,342 A * 3/1998 Gehrer ................. F16B 13/124
 411/15

FOREIGN PATENT DOCUMENTS

| IT | DE 4124727 C2 * | 1/1994 | ............... F16B 12/14 |
| IT | WO 2010006803 A1 * | 1/2010 | ........... A47B 95/008 |
| IT | WO 2010012503 A1 * | 2/2010 | ........... A47B 95/008 |
| WO | 2004032681 | 4/2004 | |
| WO | 2010012504 | 2/2010 | |

* cited by examiner

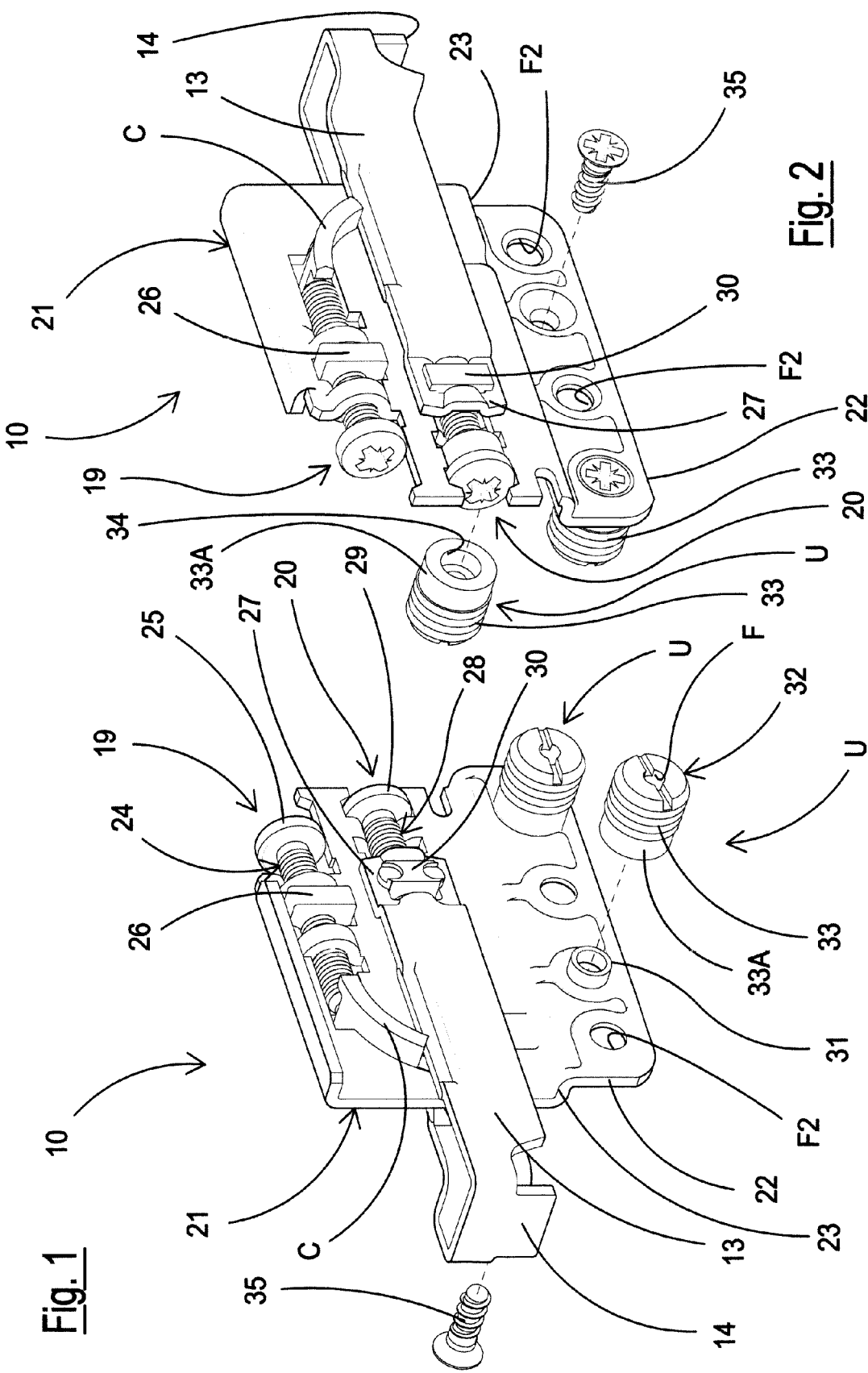

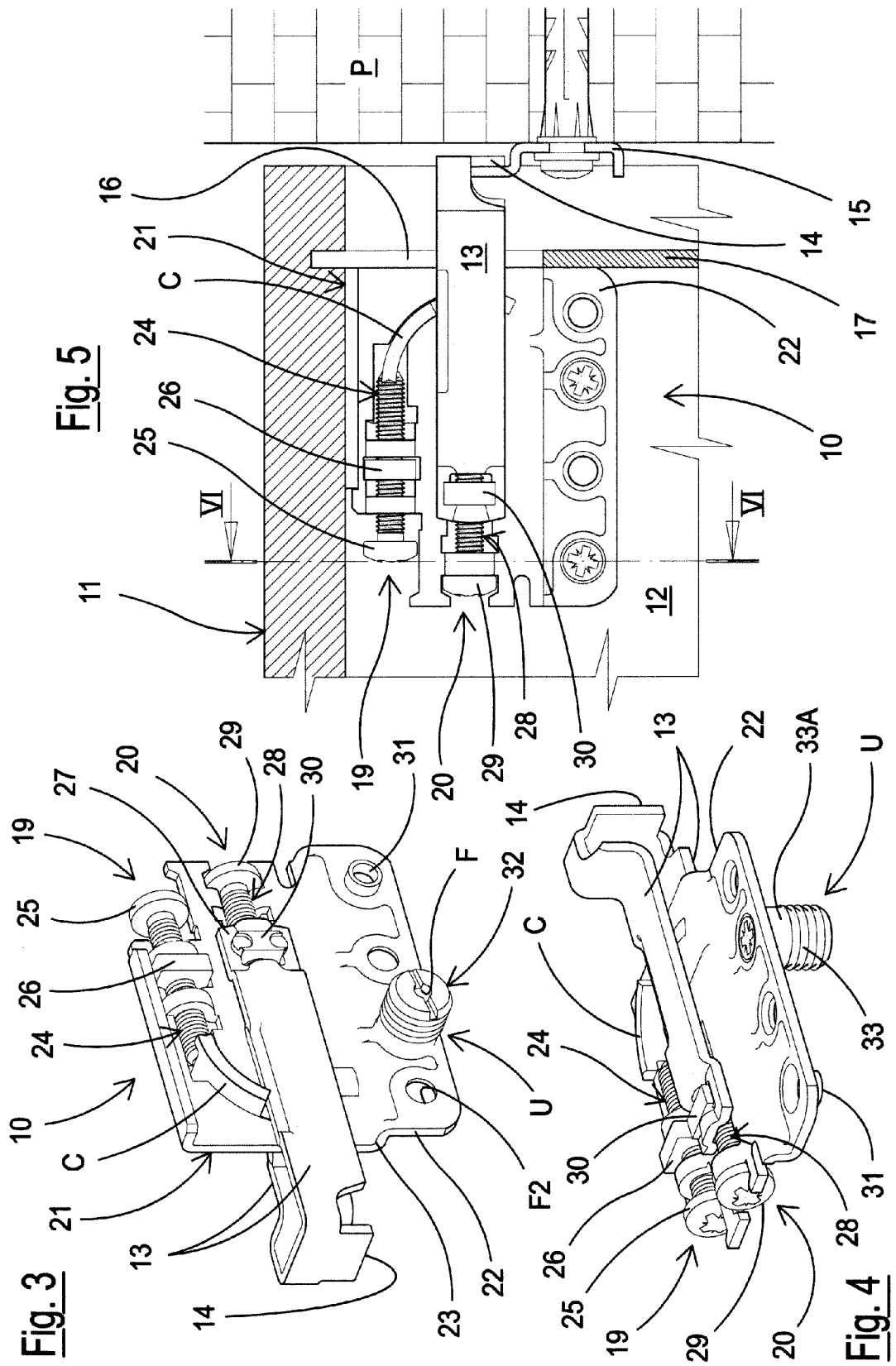

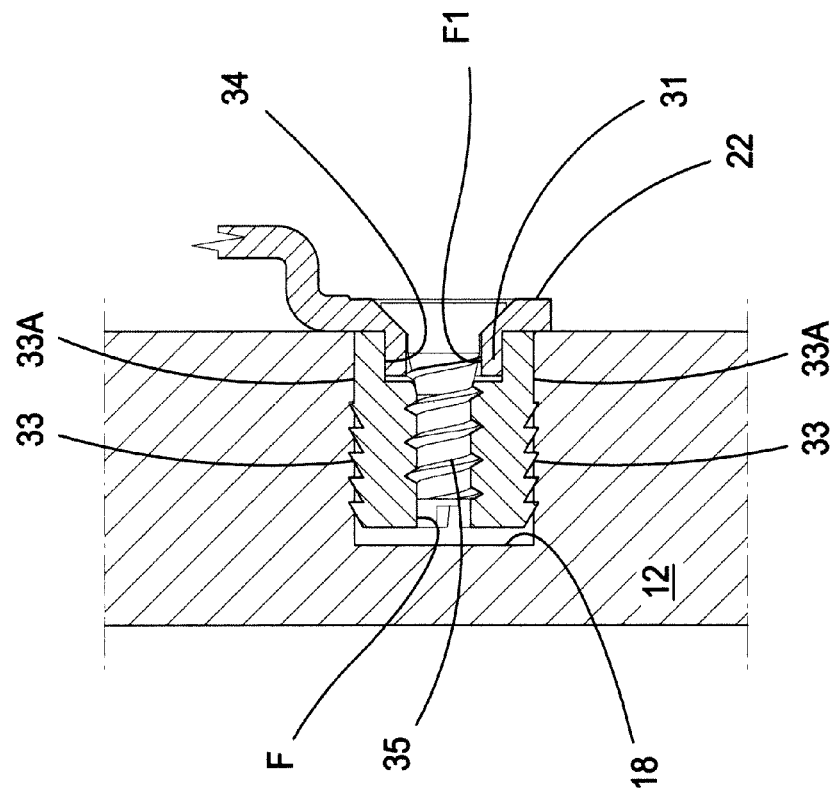
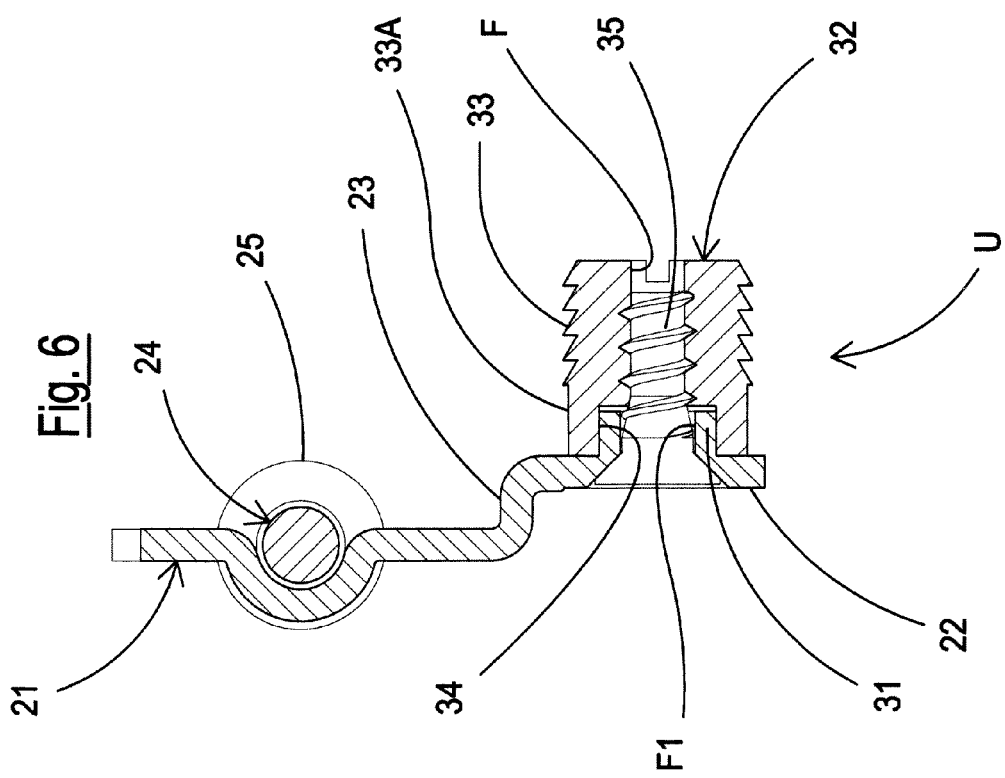

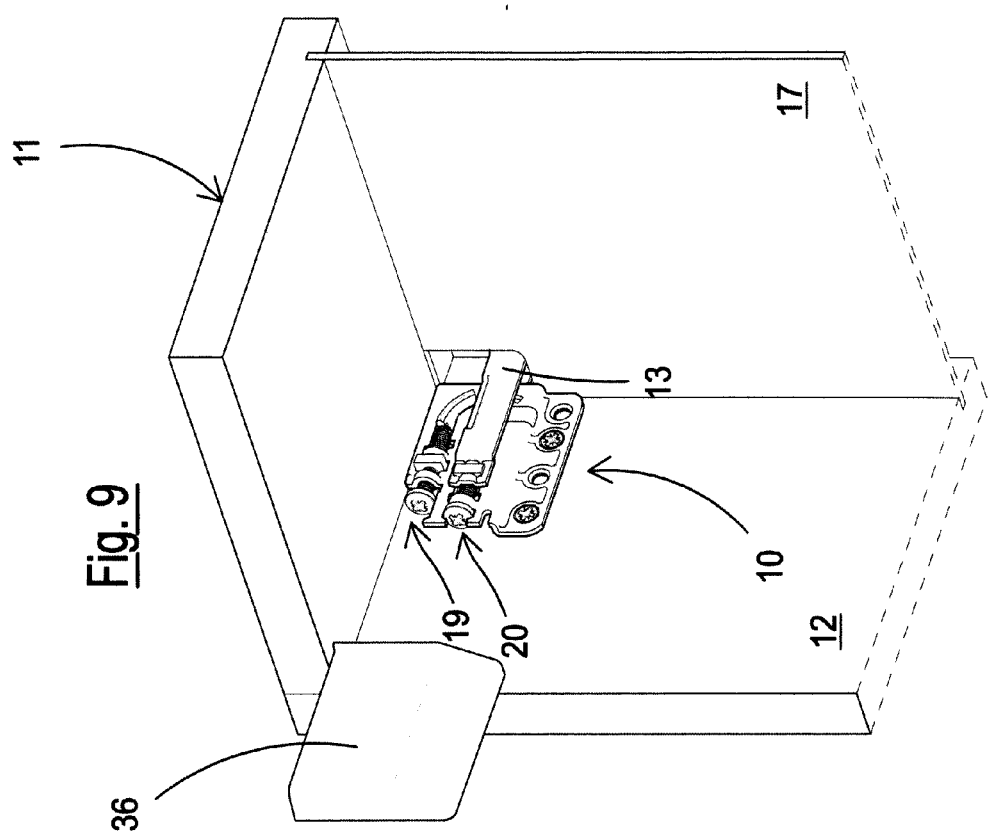
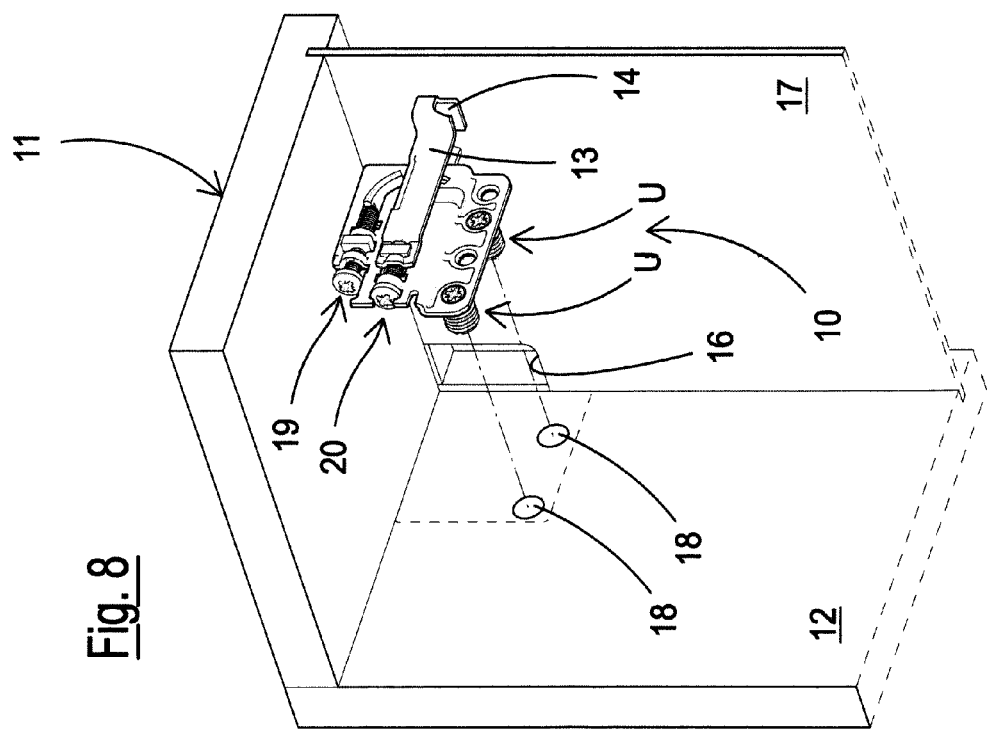

PERFECTED HANGING BRACKET FOR THE WALL ASSEMBLY OF A WALL-CUPBOARD

The present invention relates to a visible hanging bracket for the wall assembly of a wall-cupboard, with perfected fixing means to the shoulder of the same cupboard.

Hanging brackets in which a hook is positioned at the free end of an arm extending externally from a box-shaped body made of plastic material, are well-known to experts in the field.

Said box-shaped body contains two mechanisms for regulating the position of the hook in height and depth, respectively, destined to be hooked to a wall support, which can consist of a plate, a shaped metallic section, peg or other equivalent means.

The hanging bracket thus structured is fixed to the shoulder of the cupboard by means of self-tapping screws, or pressure-yielding pins made of plastic material, having a sawtooth profile, in correspondence with the upper corners of the cupboard, defined by the shoulder, possible lining and cap.

The screws are pass-through, i.e. they pass through the box-shaped body and are screwed directly onto the shoulder of the cupboard, whereas the pins extend integrally laterally from the box-shaped body made of plastic material and are pressure-inserted into a corresponding seat of the shoulder itself.

A hanging bracket of the type briefly described above is object, for example, of patents EP 0033179 B1 and EP 0632979 A1.

There are also other types of hanging brackets, which substantially differ from each other in the supports (bases) with which they are fixed to the cupboard, and also in the means with which the positions in height and depth (inclination) of the anchoring hook can be regulated.

These hanging brackets, as illustrated for example in patent EP 1228720 B1, generally consist of a metal base equipped of a side flange which, during the assembly phase, is fixed by screws or expanding pegs inside holes positioned on the shoulder of the cupboard.

As already mentioned, the above known hanging brackets comprise a movable hooking element (arm) with a hook for anchoring the same hanging bracket to the wall, which, as described in EP 1228720 B1, is operated by screw/nut-screw mechanisms, possibly equipped with angular transmissions, capable of allowing the regulation of the position of the hook (see also EP 0033179 B1 and EP 0632979 A1).

Even if these known hanging brackets are functional and respond to existing regulations relating to the safety of wall-cupboards, in view of the current tendency to reduce the thicknesses of the panels forming the wall-cupboards and the ever-increasing diffusion of this type of furniture, which are often excessively loaded, it may happen that this wall-cupboard/hanging bracket coupling is not always effective, durable and above all safe.

As the very stability of the wall-cupboard is based on this constraint, dangerous falling and/or breakage of the hanging bracket may occur, due to the shear forces acting on the wall-cupboard/hanging bracket coupling, which are generated when the cupboard is loaded.

The above drawbacks mainly arise in the hanging brackets object of EP 0033179 B1 and EP 0632979 A1 with a box-shaped body made of plastic material.

In order to overcome the above drawbacks of the known art, EP2303069A1 proposes a hanging bracket having a metal base, equipped with pins, also metallic, which are inserted into corresponding holes of the shoulder of the cupboard.

These pins, in direct contact with the surface of the hole of the shoulder, guarantee an optimum resistance to shear stress.

Yielding pegs made of plastic material and having a sawtooth profile, can collaborate with these metal pins for fixing them to the shoulder of the cupboard.

The hanging bracket is obviously also fixed to the shoulder of the cupboard by means of traditional self-tapping screws.

A general objective of the present invention is to solve the drawbacks of the known art mentioned above in an even simpler and more economic way with respect to that proposed in EP2303069A1, by providing a hanging bracket for anchoring a wall-cupboard to the wall, which is capable of resisting high shear stress that can be generated in the cupboard/hanging bracket coupling once the cupboard has been loaded.

Another objective is to provide a hanging bracket which guarantees an easy and firm assembly on any type of wall-cupboard.

In view of the above objectives, according to the present invention, a visible hanging bracket has been conceived for the wall assembly of a wall-cupboard having the characteristics specified in the main claim and enclosed dependant claims.

The structural and functional characteristics of the present invention and its advantages with respect to the known art will appear even more evident from the following description, referring to the enclosed drawings, which show an example of a hanging bracket produced according to the innovative principles of the same invention.

In the drawings:

FIGS. 1 and 2 are two exploded perspective views illustrating a hanging bracket according to the invention, from the two opposite sides;

FIG. 3 is a perspective view of the assembled hanging bracket from the same side as FIG. 1;

FIG. 4 is a perspective view of the assembled hanging bracket from the same side as FIG. 2, but taken partially from above;

FIG. 5 is a raised view illustrating the hanging bracket of FIGS. 1-4, fixed to a wall-cupboard and anchored to a supporting section fixed to the wall;

FIG. 6 is a partial section taken according to the line VI-VI of FIG. 5;

FIG. 7 is an enlarged sectional detail illustrating the fixing unit according to the invention for fixing a hanging bracket to the shoulder of a wall-cupboard; and FIGS. 8 and 9 are two perspective views illustrating the fixing phases of the hanging bracket to a wall-cupboard, only partially drawn.

With reference to the drawings, a visible hanging bracket for anchoring a wall-cupboard to the wall is indicated as a whole by 10.

Said hanging bracket 10, visible in a perspective view in FIGS. 1-4, is suitable for allowing the anchorage of a wall-cupboard 11 to a wall P and, for use, it is fixed on one side to an inner side wall (shoulder) 12 of the above-mentioned wall-cupboard 11.

As clearly illustrated in EP 2303069A1, to which reference should be made and which—for a better understanding of the present invention—when necessary, should be considered an integrant part of the present invention, the hanging bracket 10 comprises an arm 13 with an end hook 14, for anchorage to a section 15 (or equivalent support) fixed to the wall P (FIG. 5). For this purpose, the hook 14 protrudes through a hole 16 produced through a possible lining 17 of the cupboard 11 (FIGS. 8 and 9).

For fixing the hanging bracket 10 to the shoulder 12, the latter is prepared with holes 18 suitable for receiving the fixing means according to the invention, which are in the form of fixing units U, as explained in detail hereunder.

As clearly described and illustrated in EP2303069A1, a first and a second mechanism 19, 20 for regulating the position of the hanging bracket in height and depth, respectively, cooperate with the arm 13.

More specifically, the arm 13 and regulation mechanism 19 and 20 are assembled on a metallic base 21 comprising a flange 22 which serves for fixing the hanging bracket 10 to the shoulder 12 of the wall-cupboard 11. Preferably, but not necessarily, said flange 22 is integrally produced from the base 21, so as to form a step 23 for spacing the arm 13 and relative regulation mechanisms 19, 20 from the shoulder 12.

Preferably, but not necessarily, said flange 22 is situated in a position beneath said arm 13.

In short, as it is of a type which is well-known to experts in the field, in this example of hanging bracket, the first height regulation mechanism 19 comprises a screw 24, with a manoeuvring head 25, which can be screwed onto a nut 26 blocked on the base 21. As can be seen from the drawings, the end of the screw 24, opposite to the head 25, is operatively connected to the arm 13 through an arched cursor C. In this way, by rotating the screw 24, the inclination of the arm 13 varies and consequently also the position in height of the hanging bracket 10. For this purpose, the arm 13, at the opposite end with respect to the hook 14, is constrained in an articulated way (loosely) to a nut 30, enveloping it by means of shaped opposing appendages (arms) 27.

The second mechanism 20 for regulating the depth comprises, on the contrary, a screw 28, with a manoeuvring head 29, which can be screwed onto said nut 30 which is blocked on the articulated arm 13.

In this way, by rotating the screw 28, an axial movement of the arm 13 is caused, and therefore also of the position in depth of the hanging bracket 10.

According to the invention, the flange 22 typically comprises one or more fixing units U (at least one). Each unit U comprises a metallic collar 31 on which a peg 32 in the form of a yielding pin made of plastic material, is fitted (externally).

The outer cylindrical surface (casing) of said peg characteristically comprises a sawtooth portion 33 (or equivalent) and a smooth portion 33A.

More specifically, said peg 32 is axially perforated as in F and has an end seat 34 on which the collar 31 is inserted.

Said peg 32 is fixed to the collar 31 by means of a pass-through screw 35, through a corresponding hole F1 of the flange 22 and the axial hole F of the same peg 32 (FIG. 7).

As can be clearly seen in FIGS. 8 and 9, the hanging bracket 10 produced according to the invention, is fixed to the shoulder 12 of the cupboard by pressure-inserting the pegs 32 (the units U) inside the holes 18 situated in the shoulder 12 itself.

It should be noted that, thanks to the sawtooth profile 33 (or equivalent), the peg 32 guarantees a stable fixing of the hanging bracket 10 to the shoulder of the cupboard and, thanks to the smooth surface 33A, which corresponds exactly to the surface of the hole 18, ensures a high shear resistance.

Self-tapping screws (not shown) can also be envisaged for fixing the hanging bracket 10 to the shoulder 12, passing through holes F2 of the flange 22.

A top 36 can also be included (FIG. 9).

From what is described above with reference to the figures, it is evident that a visible hanging bracket for anchoring a wall-cupboard to the wall, according to the invention, is particularly inexpensive to produce. The objective specified in the preamble of the description has therefore been achieved.

The hanging bracket 10 according to the present invention also guarantees an easy and firm assembly on any type of wall-cupboard, preventing any possible misalignment of the hanging bracket 10 itself with respect to the relative cupboard, also when the cupboard is loaded.

This firm positioning is achieved thanks to the presence of the fixing units U, shear-resistant, protruding from the flange 22 towards the shoulder 12 of the wall-cupboard 11, wherein said shear-resistant fixing units U cooperate with traditional fixing means (not shown), such as screws or expansion pegs, generally equipped with gripping teeth, to guarantee a stable positioning of the hanging bracket 10 on the shoulder 12 of the wall-cupboard 11.

The forms of the visible hanging bracket for fixing a wall-cupboard to the wall according to the invention, as also the materials, can obviously differ from that shown for purely illustrative and non-limiting purposes in the drawings.

The protection scope of the invention is therefore delimited by the enclosed claims.

The invention claimed is:

1. A hanging bracket (10) for wall assembly (P) of a wall-cupboard (11) comprising:
    a metallic base (21);
    an arm (13) assembled and articulated on said base (21) and protruding from said base with a hook (14) configured for anchoring to a plate fixed to said wall (P);
    first and second regulation mechanisms (19, 20) regulating a position of said arm (13) respectively in height and in depth; and
    a flange (22) integral with said base (21) and equipped with at least one fixing unit (U) fixing the hanging bracket (10) onto said wall-cupboard (11),
    wherein said fixing unit (U) comprises a shear-resistant element that includes a fixing peg (32) of the hanging bracket (10) to a shoulder (12) of the wall-cupboard (11), said peg (32) being fitted onto a collar (31) protruding from said flange (22) to receive said collar within, a reciprocal fixing element coupling said collar (31) and said peg (32), to make said collar (31) and said peg (32) matingly cooperate with each other,
    wherein said peg (32) is configured as a pin suitable for being press-inserted into a corresponding hole (18) defined in the shoulder (12) of said wall-cupboard (11), said collar (31) being produced as a single piece with, and extending from, said flange (22), said peg being a flexible plastic pin having a sawtooth profile and a smooth portion longitudinally aligned with, and contacting, said sawtooth profile, said sawtooth profile and said smooth portion defining an entirely closed longitudinal outer surface of said peg (32), and
    wherein said peg (32) has an inner narrower bore of constant diameter that receives said reciprocal fixing element and an inner wider end-seat (34) that is longitudinally aligned with said bore and that receives an outside of said collar (31), such to cause said peg (32) to be entirely received within the corresponding hole (18) defined in said shoulder, said smooth portion of said peg (32) being at least partly in a same longitudinal position as said collar.

2. The hanging bracket (10) according to claim 1, wherein all of said smooth portion (33A) has an outer diameter equal to a diameter of said hole for coupling with said hole (18).

3. The hanging bracket (10) according to claim 1, wherein said flange (22) is produced in a single piece extending from said base (21).

4. The hanging bracket (10) according to claim 1, wherein said reciprocal fixing element between said collar (31) and said peg (32) consists of a screw (35) passing through a hole (F1) of said collar and screwed into a corresponding axial hole (F) of said peg (32).

5. The hanging bracket (10) according to claim 1, wherein said first regulation mechanism (19) comprises a screw (24) with an operating head (25) which is screwed onto a nut (26) blocked on the base (21), an end of the screw (24), opposite to the operating head (25), being operatively connected to the arm (13) through an arched cursor (C), so that by rotating the screw (24), an inclination of the arm (13), and therefore a position of the hanging bracket (10), is varied in height, the arm (13), at an opposite end with respect to the hook (14), being articulated.

6. The hanging bracket (10) according to claim 1, wherein said second regulation mechanism (20) comprises a screw (28), with an operating head (29), which is screwed onto a nut (30) which is blocked on the arm (13), said arm (13) being slackly constrained in an articulated manner to said nut (30) by arms (27), so that, by rotating the screw (28), there is an axial movement of the arm (13) and consequently a different depth position of the hanging bracket (10).

\* \* \* \* \*